(12) United States Patent
Rademacher et al.

(10) Patent No.: US 7,598,322 B1
(45) Date of Patent: Oct. 6, 2009

(54) FUNCTIONALIZED POLYMERS AND IMPROVED TIRES THEREFROM

(75) Inventors: Christine Rademacher, Akron, OH (US); Steven Luo, Copley, OH (US); Terrence E. Hogan, Akron, OH (US)

(73) Assignee: Bridgestone Corporation (JP)

( * ) Notice: Subject to any disclaimer, the term of this patent is extended or adjusted under 35 U.S.C. 154(b) by 635 days.

(21) Appl. No.: 11/189,891

(22) Filed: Jul. 26, 2005

Related U.S. Application Data

(60) Provisional application No. 60/591,065, filed on Jul. 26, 2004.

(51) Int. Cl.
*C08C 19/34* (2006.01)
*C08C 19/00* (2006.01)

(52) U.S. Cl. .................. 525/337; 525/383; 525/385

(58) Field of Classification Search .................. 525/337, 525/383, 385
See application file for complete search history.

(56) References Cited

U.S. PATENT DOCUMENTS

| | | | | |
|---|---|---|---|---|
| 5,151,475 A | | 9/1992 | Stevens et al. ................. 526/83 |
| 5,247,023 A | * | 9/1993 | Chung et al. ................. 525/288 |
| 5,476,915 A | * | 12/1995 | Shea et al. ...................... 528/4 |
| 6,025,430 A | * | 2/2000 | Blok et al. ................... 524/526 |
| 2002/0198327 A1 | | 12/2002 | Chung ........................ 525/251 |
| 2008/0161489 A1 | | 7/2008 | Halasa |

* cited by examiner

*Primary Examiner*—Ling-Siu Choi
(74) *Attorney, Agent, or Firm*—Meredith E. Hooker; Arthur Reginelli

(57) ABSTRACT

A tire component comprising a vulcanized rubber deriving from a functionalized polymer defined by the formula I

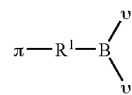

where π is a polymer chain, B is a boron atom, $R^1$ is a bond or a divalent organic group, and each υ is independently selected from alkoxy groups (—OR), thioalkoxy groups (—SR), amino groups (—$NR_2$), or phosphino groups (—$PR_2$), where each R is independently selected from monovalent organic groups or two R groups form a divalent organic group, which forms a cyclic structure.

15 Claims, No Drawings

FUNCTIONALIZED POLYMERS AND IMPROVED TIRES THEREFROM

This application claims the benefit of U.S. Provisional Application No. 60/591,065, filed Jul. 26, 2004.

FIELD OF THE INVENTION

One or more embodiments of this invention relates to functionalized polymers and their use in the manufacture of tires.

BACKGROUND OF THE INVENTION

In the art of making tires, IT may be desirable to employ rubber vulcanizates that demonstrate reduced hysteresis loss, i.e., less loss of mechanical energy to heat. Hysteresis loss can be attributed to polymer free ends within the cross-linked rubber network, as well as the disassociation of filler agglomerates. The degree of dispersion of filler within the vulcanizate can also be a factor because increased dispersion may provide better wear resistance.

Functionalized polymers have been employed to reduce hysteresis loss and increase bound rubber. The functional group of the functionalized polymer is believed to reduce the number of polymer free ends via interaction with filler particles. Also, this interaction reduce filler agglomeration, which can thereby reduce hysteretic losses attributable to the disassociation of filler agglomerates (i.e., Payne effect).

Conjugated diene monomers can be anionically polymerized by using alkyllithium compounds as initiators. Selection of certain alkyllithium compounds can provide a polymer product having functionality at the head of the polymer chain. A functional group can also be attached to the tail end of an anionically-polymerized polymer by terminating a living polymer with a functionalized compound.

For example, trialkyltin chlorides, such as tributyl tin chloride, have been employed to terminate the polymerization of conjugated dienes, as well as the copolymerization of conjugated dienes and vinyl aromatic monomers, to produce polymers having a trialkyltin functionality at the tail end of the polymer. These polymers have proven to be technologically useful in the manufacture of tire treads that are characterized by improved traction, low rolling resistance, and improved wear.

Because functionalized polymers are advantageous, especially in the preparation of tire compositions, there exists a need for additional functionalized polymers. Moreover, because precipitated silica has been increasingly used as reinforcing particulate filler in tires, functionalized elastomers having affinity to silica filler are needed.

SUMMARY OF THE INVENTION

In general the present invention provides a tire component comprising a vulcanized residue of a functionalized polymer defined by the formula I

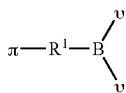

where $\pi$ is a polymer chain, B is a boron atom, $R^1$ is a bond or a divalent organic group, and each $\upsilon$ is independently selected from alkoxy groups (—OR), thioalkoxy groups (—SR), amino groups (—$NR_2$), or phosphino groups (—$PR_2$), where each R is independently selected from monovalent organic groups or two R groups form a divalent organic group, which forms a cyclic structure.

The present invention also includes a tire component prepared by a process comprising vulcanizing a rubber formulation comprising a vulcanizable rubber and a filler, where the vulcanizable rubber includes a functionalized polymer that is defined by the formula I

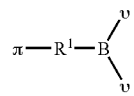

where $\pi$ is a polymer chain, B is a boron atom, $R^1$ is a bond or a divalent organic group, and each $\upsilon$ is independently selected from alkoxy groups (—OR), thioalkoxy groups (—SR), amino groups (—$NR_2$), or phosphino groups (—$PR_2$), where each R is independently selected from monovalent organic groups or two R groups form a divalent organic group, which forms a cyclic structure.

DETAILED DESCRIPTION OF ILLUSTRATIVE EMBODIMENTS

In one or more embodiments, the functionalized polymers that are useful in the manufacture of tires include a boron atom or functionality at or near at least one end of a polymer chain. In one embodiment, the functionalized polymers are employed in the manufacture of tire treads and as a result tires having reduced rolling resistance can be prepared.

In one or more embodiments, the functionalized polymers can be defined by the formula I

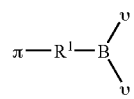

where $\pi$ is a polymer chain, B is a boron atom, $R^1$ is a bond or a divalent organic group, and each $\upsilon$ is independently selected from alkoxy groups (—OR), thioalkoxy groups (—SR), amino groups (—$NR_2$), or phosphino groups (—$PR_2$), where each R is independently selected from monovalent organic groups or two R groups form a divalent organic group, which forms a cyclic structure.

In one embodiment, where both $\upsilon$ groups are alkoxy groups (—OR), the functionalized polymer can be defined by the formula 1A.

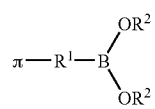

where $\pi$ is a polymer chain, $R^1$ is a bond or a divalent organic group, B is a boron atom, O is an oxygen atom, and each $R^2$ is independently a monovalent organic group or two $R^2$ groups join to form a divalent organic group, which forms a cyclic structure.

In another embodiment, where both υ groups are thioalkoxy groups (—SR), the functionalized polymer can be defined by the formula 1B

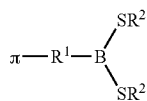

where π is a polymer chain, $R^1$ is a bond or a divalent organic group, B is a boron atom, S is an sulfur atom, and each $R^2$ is independently a monovalent organic group or two $R^2$ groups join to form a divalent organic group, which forms a cyclic structure.

In still another embodiment, where both υ groups are amino groups (—NR$_2$), the functionalized polymer can be defined by the formula 1C

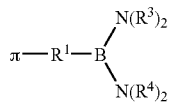

where π is a polymer chain, $R^1$ is a bond or a divalent organic group, B is a boron atom, N is a nitrogen atom, and each $R^3$ is independently a monovalent organic group or two $R^3$ groups join to form a divalent organic group, which forms a cyclic structure, each $R^4$ is independently a monovalent organic group or two $R^4$ groups join to form a divalent organic group, which forms a cyclic structure, or where one $R^3$ and one $R^4$ group join to form a divalent organic group, which forms a cyclic structure.

In yet another embodiment, where both υ groups are phosphino groups (—PR$_2$), the functionalized polymer can be defined by the formula 1D

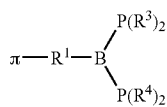

where π is a polymer chain, $R^1$ is a bond or a divalent organic group, B is a boron atom, P is an phosphorous atom, and each $R^3$ is independently a monovalent organic group or two $R^3$ groups join to form a divalent organic group, which forms a cyclic structure, each $R^4$ is independently a monovalent organic group or two $R^4$ groups join to form a divalent organic group, which forms a cyclic structure, or where one $R^3$ and one $R^4$ group join to form a divalent organic group, which forms a cyclic structure.

The polymer chain (π) of the functionalized polymer may include a rubbery polymer. In one embodiment, the polymer chain substituent includes a polymer that has a glass transition temperature (Tg) that is less than 0° C., in other embodiments less than −20° C., and in other embodiments less than −30° C. In one or more embodiments, the rubbery polymer chain exhibits a single glass transition temperature.

In one or more embodiments, the polymer chain includes anionically polymerized polymers. Examples of these polymers include polybutadiene, polyisoprene, poly(styrene-co-butadiene), poly(styrene-co-butadiene-co-isoprene), poly(isoprene-co-styrene), and poly(butadiene-co-isoprene).

In one or more embodiments, the polymer substituent may be characterized by a number average molecular weight ($M_n$) of from about 5 to about 1,000 kg/mole, in other embodiments from about 50 to about 500 kg/mole, and in other embodiments 100 to about 300 kg/mole, as measured by using Gel Permeation Chromatography (GPC) calibrated with polystyrene standards and adjusted for the Mark-Houwink constants for the polymer in question.

The divalent organic group can include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms.

The monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms. In one or more embodiments, monovalent organic groups will not react with a living polymer.

In one or more embodiments, the functionalized polymer includes a functional group at the head of the polymer; i.e., at an end other than that including the boron atom or functionality. This functionalized polymer can be defined by the formula II

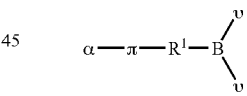

where α includes a functionality or functional group that reacts or interacts with rubber or rubber fillers or otherwise has a desirable impact on filled rubber compositions or vulcanizates, π is a polymer chain, B is a boron atom, and υ is independently selected from alkoxy groups (—OR), thioalkoxy groups (SR), amino groups (—NR$_2$), or phosphino groups (—PR$_2$), where each R is independently selected from monovalent organic groups or two R groups form a divalent organic group, which forms a cyclic structure.

Those groups or substituents that react or interact with rubber or rubber fillers or otherwise have a desirable impact on filler rubber compositions or vulcanizates include known substituents such as trialkyl tin substituents, cyclic amine groups, or sulfur-containing heterocycles. Exemplary trialkyl tin substituents are disclosed in U.S. Pat. No. 5,268,439, which is incorporated herein by reference. Exemplary cyclic amine groups are disclosed in U.S. Pat. Nos. 6,080,853, 5,786,448, 6,025,450, and 6,046,288, which are incorporated herein by reference. Exemplary sulfur-containing heterocycles are disclosed in WO 2004/020475, which is incorporated herein by reference.

The functionalized polymers may be prepared by reacting or terminating a living polymer with an organoboron compound.

Organoboron compounds include those defined by the formula III

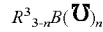

where each Ʊ is independently selected from alkoxy groups (—OR), thioalkoxy groups (—SR), amino groups (—NR$_2$), or phosphino groups (PR$_2$), where each R is independently a monovalent organic group or two R groups form a divalent organic group, which forms a cyclic structure, each R$^3$ is independently a monoorganic group, a halide, or two R$^3$ groups form a divalent organic group, which forms a cyclic structure, and n is an integer from 1 to 3. Useful halides include bromine and chlorine.

Types of organoboron compounds include alkoxyboranes, thioalkoxyboranes, aminoboranes, phosphinoboranes, and mixes thereof.

Examples of trialkoxyboranes include triethoxyborane, tri-n-propoxyborane, tri-isopropoxyborane, tri-n-butoxyborane, tri-t-butoxyborane, tripentoxyborane, trihexoxyborane, triheptoxyborane, triphenoxyborane, and mixtures thereof.

Examples dialkoxyalkyl boranes include diethoxyethylborane, dipropoxypropylborane, di-n-butoxybutylborane, di-t-butoxypropylborane, dipentoxyethylborane, diisoproxybutylborane, diphenoxyphenylborane, diphenoxypropylborane, and mixtures thereof.

Examples of alkoxydialkylboranes include diethylethoxyborane, diethylpropoxyborane, dibutylpropoxyborane, diisopropylisopropoxyborane, t-butoxydiisopropylborane, n-butoxydi-n-butylborane, t-butoxydi-t-butylborane, dipropylpentoxyborane, dipentylpentoxyborane, diphenylphenoxyborane, and mixtures thereof.

Examples dialkoxyhaloboranes include chlorodiethoxyborane, bromodipropoxyborane, chloro-di-n-butoxyborane, bromo-di-t-butoxyborane, chloro-dipentoxyborane, bromo-diisoproxyborane, chloro-diphenoxyborane, bromo-diphenoxyborane, and mixtures thereof.

Types of thioalkoxyboranes include trithioalkoxyboranes, dithioalkoxyalkylboranes, thioalkoxydialkylboranes, and dithioalkoxyhaloboranes.

Examples of trithioalkoxyboranes include trithioethoxyborane, trithio-n-propoxyborane, trithioisopropoxyborane, trithio-n-butoxyborane, trithio-t-butoxyborane, trithiopentoxyborane, trithiohexoxyborane, trithioheptoxyborane, trithiophenoxyborane, and mixtures thereof.

Examples of dithioalkoxyalkyl boranes include dithioethoxyethylborane, dithiopropoxypropylborane, butyldithio-n-butoxyborane, dithio-t-butoxypropylborane, dithiopentoxyethylborane, butyldithioisopropoxyborane, dithiophenoxyphenylborane, dithiophenoxypropylborane, and mixtures thereof.

Examples of thioalkoxydialkylboranes include diethylthioethoxyborane, diethylthiopropoxyborane, dibutylthiopropoxyborane, diisopropylthioisopropoxyborane, diisopropylthio-t-butoxyborane, di-n-butyl-thio-n-butoxyborane, di-t-butylthio-t-butoxyborane, dipropylpentoxyborane, dipentylthiopentoxyborane, diphenylthiophenoxyborane, and mixtures thereof.

Examples of dithioalkoxyhaloboranes include chlorodithioethoxyborane, bromodithiopropoxyborane, chlorodithio-n-butoxyborane, bromodithio-t-butoxyborane, chlorodithiopentoxyborane, bromodithioisopropoxyborane, chlorodithiophenoxyborane, bromodithiophenoxyborane, and mixtures thereof.

Types of aminoboranes include tris(dialkylamino)boranes, bis(dialkylamino) alkylboranes, and bis(dialkylamino)haloboranes.

Examples of tris(dialkylamino)boranes include tris (diethylamino)borane, tris(dipropylamino)borane, tris(di-n-butylamino)borane, tris (di-t-butylamino)borane, tris (diphenylamino)borane, tris(diphenylamino)borane, and mixtures thereof.

Examples of bis(dialkylamino)alkylboranes include bis (diethylamino) ethylborane, bis(dipropylamino) propylborane, bis(di-n-butylamino)butylborane, bis(di-t-butylamino)-t-butylborane, bis(dipentylamino)pentylborane, bis (diphenylamino)phenylborane, bis(diethylamino) propylborane, bis(dipropylamino)butylborane, bis(di-n-butylamino)propylborane, bis(di-t-butylamino)ethylborane, bis (dipentylamino)propylborane, bis(diphenylamino)ethylborane, and mixtures thereof.

Examples of bis(dialkylamino)haloboranes include bis(diethylamino) chloroborane, bis(dipropylamino)bromoborane, bis(di-n-butylamino)chloroborane, bis(di-t-butylamino)bromoborane, bis(diphenylamino) chloroborane, bis(diphenylamino)bromoborane, and mixtures thereof.

Types of phosphinoboranes include tris(dialkylphosphino) boranes, bis(dialkylphosphino)alkylboranes, and bis(dialkylphosphino)haloboranes.

Examples of tris(dialkylphosphino)boranes include tris (diethylphosphino)borane, tris(dipropylphosphino)borane, tris(di-n-butylphosphino)borane, tris(di-t-butylphosphino) borane, tris(diphenylphosphino)borane, tris(diphenylphosphino)borane, and mixtures thereof.

Examples of bis(dialkylphosphino)alkylboranes include bis(diethylphosphino)ethylborane, bis(dipropylphosphino) propylborane, bis(di-n-butylphosphino)butylborane, bis(di-t-butylphosphino)-t-butylborane, bis(dipentylphosphino) pentylborane, bis(diphenylphosphino)phenylborane, bis (diethylphosphino)propylborane, bis(dipropylphosphino) butylborane, bis(di-n-butylphosphino)propylborane, bis(di-t-butylphosphino)ethylborane, bis(dipentylphosphino) propylborane, bis(diphenylphosphino) ethylborane, and mixtures thereof.

Examples of bis(dialkylphosphino)haloboranes include bis(diethylphosphino)chloroborane, bis(dipropylphosphino) bromoborane, bis(di-n-butylphosphino)chloroborane, bis(di-t-butylphosphino)bromoborane, bis(diphenylphosphino) chloroborane, bis(diphenylphosphino)bromoborane, and mixtures thereof.

Examples of cyclic boranes include trimethylboroxine and B-methoxy catechol boranes.

Living polymers include anionically polymerized polymers. Anionically-polymerized living polymers may be formed by reacting anionic initiators with certain unsaturated monomers to propagate a polymeric structure. Throughout formation and propagation of the polymer, the polymeric structure may be anionic and "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 (3$^{rd}$ Ed. 1991), or Panek 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers can be used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, N-lithium dihydro-carbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, 5,786,441, and International Publication No. WO 2004/020475, which are incorporated herein by reference.

The amount of initiator employed in conducting anionic polymerizations can vary widely based upon the desired polymer characteristics. In one embodiment, from about 0.1 to about 100, and in other embodiments from about 0.33 to about 10 mmol of lithium per 100 g of monomer is employed.

Anionic polymerizations may be conducted in a polar solvent such as tetrahydrofuran (THF), or in a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. These randomizers may be used in amounts between 0 and 90 or more equivalents per equivalent of lithium. The amount may depend on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis(2'-tetrahydrofuryl) propane, di-piperidyl ethane, dipiperidyl methane, hexamethylphosphoramide, N—N'-dimethylpiperazine, diazabicyclooctane, dimethyl ether, diethyl ether, tributylamine and the like. Linear and cyclic oligomeric oxolanyl alkane modifiers are described in U.S. Pat. No. 4,429,091, which is incorporated herein by reference.

Anionically polymerized living polymers can be prepared by either batch or continuous methods. A batch polymerization may be begun by charging a blend of monomer(s) and normal alkane solvent to a suitable reaction vessel, followed by the addition of the polar coordinator (if employed) and an initiator compound. The reactants can be heated to a temperature of from about 20 to about 130° C. and the polymerization may be allowed to proceed for from about 0.1 to about 24 hours. This reaction can produce a reactive polymer having a reactive or living end. In one or more embodiments, at least about 30% of the polymer molecules contain a living end, in other embodiments at least about 50% of the polymer molecules contain a living end, and in other embodiments at least about 80% contain a living end.

The functionalizing agent can be reacted with the living polymer end. This reaction can be achieved by simply mixing the functionalizing agent with the living polymer. In one embodiment, the functionalizing agent can be added once a peak polymerization temperature, which is indicative of nearly complete monomer conversion, is observed. Because live ends may self-terminate, it may be desirable to add the functionalizing agent within about 25 to 35 minutes of the peak polymerization temperature.

The amount of functionalizing agent employed to prepare the functionalized polymers can be best described with respect to the equivalents of lithium or metal cation within the initiator. Accordingly, where a lithium initiator is employed, the moles of functionalizing agent per mole of lithium can be about 0.3 to about 2, in other embodiments from 0.6 to about 1.5, in other embodiments from about 0.7 to about 1.3, and in other embodiments from at least about 0.8 to about 1.1.

In certain embodiments of this invention, the functionalizing agent can be employed in combination with other coupling or terminating agents. The combination of functionalizing agent with other terminating agent or coupling agent can be in any molar ratio. The coupling agents that can be employed in combination with the functionalizing agent include any of those coupling agents known in the art including, but not limited to, tin tetrachloride, tetraethyl ortho silicate, and tetraethoxy tin, and silicon tetrachloride. Likewise, any terminating agent can be employed in combination with the functionalizing agent including, but not limited to, tributyltin chloride.

After formation of the functional polymer, a processing aid and other optional additives such as oil can be added to the polymer cement. The functional polymer and other optional ingredients can then be isolated from the solvent and dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

After formation of the functional polymer, a processing aid and other optional additives such as oil can be added to the polymer cement. The functional polymer and other optional ingredients can then be isolated from the solvent and preferably dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

The functionalized polymers of this invention are useful in preparing tire components. These tire components can be prepared by using the functionalized polymers of this invention alone or together with other rubbery polymers. Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in 20 Kirk-Othmer, *Encyclopedia of Chemical Technology*, 365-468, ($3^{rd}$ Ed. 1982), particularly *Vulcanization Agents and Auxiliary Materials*, 390-402, and A. Y. Coran, *Vulcanization in Encyclopedia of Polymer Science and Engineering*, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These stocks may be useful for forming tire components such as treads, subtreads, black sidewalls, body ply skins, bead filler, and the like. In one or more embodiments, the functional polymers of this invention are employed in tread formulations, and these tread formulations may include from about 10 to about 100% by weight of the functional polymer based on the total rubber within the formulation, in other embodiments, the tread formulation may include from about 35 to about 90% by weight, and in other embodiments from about 50 to 80% by weight of the functional polymer based on the total weight of the rubber within the formulation. The preparation of vulcanizable compositions and the construction and curing of the tire may not be affected by the practice of this invention.

The vulcanizable rubber composition can be prepared by forming an initial masterbatch that includes the rubber component and filler. This initial masterbatch can be mixed at a starting temperature of from about 25° C. to about 125° C. with a discharge temperature of about 135° C. to about 180° C. To prevent premature vulcanization (also known as scorch), this initial masterbatch may exclude any vulcanizing agents. Once the initial masterbatch is processed, the vulcanizing agents can be introduced and blended into the initial masterbatch at low temperatures in a final mix stage, which may not initiate the vulcanization process. Optionally, additional mixing stages, sometimes called remills, can be employed between the masterbatch mix stage and the final mix stage. Rubber compounding techniques and the additives employed therein are generally known as disclosed in Stephens, *The Compounding and Vulcanization of Rubber*, in *Rubber Technology* ($2^{nd}$ Ed. 1973). The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization can be effected by heating the vulcanizable composition in a mold; e.g., it is heated to about 140 to about 180° C. Cured or crosslinked rubber compositions may be referred to as vulcanizates, which generally contain three-dimensional polymeric networks that are thermoset. In one or more embodiments, the vulcanizate includes a vulcanized residue or vulcanization product of the functionalized polymer. The other ingredients, such as processing aides and fillers, may be evenly dispersed throughout the vulcanized network. Pneumatic tires can be made as discussed in U.S. Pat. Nos. 5,866, 171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Experiment 1

A living polymer cement was prepared by charging a 5-gallon reactor with 4.5 Kg of technical hexanes, 1.23 Kg of a 33% solution of styrene/hexane blend, and 7.82 Kg of a 21% 1,3-butadiene/hexane blend. A polar randomizer (about 0.33 equivalents per equivalent of lithium) and n-butyllithium initiator (11 mL of a 1.68 molar solution) were subsequently charged. The reactor was heated in batch mode to 50° C. The reaction exotherm to 65° C. within 30 minutes and the reaction was then stirred for an additional 20 minutes. The resulting cement was then apportioned to bottles that were dried, nitrogen purged, and ultimately capped for subsequent termination reaction.

A first bottle of polymer cement was employed to prepare a control (Sample 1). Isopropyl alcohol was used to both terminate and coagulate the polymer. The coagulated polymer was then drum dried.

Experiment 2

A second bottle prepared in Experiment 1 was employed to form a functionalized polymer. Specifically, 0.9 equivalent of tri-n-butoxy borane per equivalent of lithium was added to the bottle and the bottle was then agitated for 30 minutes at 50° C. The functionalized polymer was then coagulated in isopropyl alcohol and drum dried.

Experiment 3

Using similar living polymer to that prepared in Experiment 1, a living polymer sample (Sample 3) was terminated with 0.9 equivalent of tri-t-butoxy borane per equivalent of lithium and agitated at 50° C. for 30 minutes. The terminated polymer was coagulated in isopropyl alcohol and drum dried.

Experiment 4

Using similar living polymer to that prepared in Experiment 1, a living polymer sample (Sample 4) was terminated with 0.9 equivalent of triphenoxy borane per equivalent of lithium and agitated at 50° C. for 30 minutes. The terminated polymer was coagulated in isopropyl alcohol and drum dried.

Experiment 5

Using similar living polymer to that prepared in Experiment 1, a living polymer sample (Sample 5) was terminated with 0.9 equivalent of trimethylboroxine per equivalent of lithium and agitated at 50° C. for 30 minutes. The terminated polymer was coagulated in isopropyl alcohol and drum dried.

Experiment 6

The functionalized polymers prepared above were each employed to prepare separate tire formulations that included either a carbon black reinforcement or a silica and carbon black blend reinforcement. The recipes for the tire formulations are set forth in Table I.

TABLE I

| Ingredient | Carbon Black Formulation (phr) | Mixed Silica Formulation (phr) |
|---|---|---|
| Functionalized Polymer | 100 | 100 |
| Carbon Black | 55 | 35 |
| Silica | — | 30 |
| Antiozonant | 0.95 | 0.95 |
| Zinc Oxide | 2.5 | 2.5 |
| Stearic Acid | 2 | 1.5 |
| Oil | 10 | 10 |

TABLE I-continued

| Ingredient | Carbon Black Formulation (phr) | Mixed Silica Formulation (phr) |
|---|---|---|
| Wax | 1 | 1.03 |
| Coupling Agent | — | 2.74 |
| Binder | — | 0.8 |
| Sulfur | 1.3 | 1.7 |
| Accelerator | 1.9 | 2.0 |
| Scorch Inhibitor | — | 0.25 |

The tire formulations were mixed using conventional mixing procedures. Namely, when preparing formulations that included carbon black reinforcement, the ingredients (excluding the sulfur and accelerators) were initially mixed at about 134° C. and the sulfur and accelerators were subsequently added in a separate mixing step that was conducted at about 63° C. Where the formulations included both carbon black and silica, the ingredients (excluding sulfur, accelerators, binder, coupling agents, and wax) were mixed at about 168° C., the coupling agent was subsequently added and mixed at about 137° C., and the sulfur, accelerators, and wax were added in a subsequent mixing step and mixed at about 95° C.

The formulations were then prepared into test specimens and cured within a closed cavity mold under pressure for 15 minutes at 171° C. The test specimens were then subjected to various physical tests, and the results of these tests are reported in Table II for the formulations that exclusively included carbon black as a reinforcement and in Table III for the formulations that included a carbon black/silica blend. The formulation numbers set forth in Tables II and III correspond to the Sample numbers of the functionalized polymers above, and those employed in carbon black recipes include the designation "A" and those employed in carbon black/silica formulations include the designation "B."

TABLE II

| Formulation | 1A | 2A | 3A | 4A | 5A |
|---|---|---|---|---|---|
| $ML_{1+4}$ @ 130° C. | 24.9 | 31.2 | 28.0 | 27.7 | 28.6 |
| 300% Modulus @ 23° C. (MPa) | 11.19 | 11.21 | 10.99 | 11.55 | 10.61 |
| Tensile Strength @ 23° C. (MPa) | 16.26 | 17.06 | 16.66 | 17.01 | 16.69 |
| Temperature Sweep 0° C. tan δ | 0.2317 | 0.2601 | 0.2470 | 0.2299 | 0.2430 |
| Temperature Sweep 50° C. tan δ | 0.2664 | 0.2396 | 0.2628 | 0.2611 | 0.2631 |
| ΔG' (MPa) | 4.1178 | 1.3859 | 2.8784 | 3.51 | 2.7211 |
| 50° C. RDA Strain sweep (5% strain) tan δ | 0.2639 | 0.1727 | 0.2247 | 0.2372 | 0.2237 |
| Bound Rubber (%) | 12.6 | 31.6 | 31.6 | 23.4 | 22.7 |

TABLE III

| Formulation | 1B | 2B | 3B | 4B | 5B |
|---|---|---|---|---|---|
| $ML_{1+4}$ @ 130° C. | 59.2 | 66.5 | 64.9 | 76.1 | 65.6 |
| 300% Modulus @ 23° C. (MPa) | 8.1 | 8.5 | 8.5 | 8.5 | 8.6 |
| Tensile Strength @ 23° C. (MPa) | 11.6 | 12.0 | 11.8 | 12.0 | 12.5 |
| Temperature Sweep 0° C. tan δ | 0.1963 | 0.2021 | 0.1989 | 0.1902 | 0.1999 |
| Temperature Sweep 50° C. tan δ | 0.2426 | 0.2239 | 0.2271 | 0.2265 | 0.2289 |
| ΔG' (MPa) | 7.164 | 5.801 | 6.603 | 9.109 | 5.753 |
| 50° C. RDA Strain sweep (5% strain) tan δ | 0.2404 | 0.2082 | 0.2189 | 0.2280 | 0.2225 |
| Bound Rubber (%) | 21.6 | 31.4 | 27.4 | 27.9 | 27.3 |

Mooney viscosity measurement was conducted at 130° C. using a large rotor. The Mooney viscosity was recorded as the torque when the rotor has rotated for 4 minutes. The sample is preheated at 130° C. for 1 minute before the rotor starts.

The bound rubber content test was used to determine the percent of polymer bound to filler particles in tire tread stocks. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Polymer} = \frac{100(Wd - F)}{R} \quad (1)$$

where Wd is the weight of dried gel, F is the weight of filler in gel or solvent insoluble matter (same as weight of filler in original sample), and R is the weight of polymer in original sample.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test. Heat aged data was obtained after heating the vulcanizates for 24 hours at 100° C.

Temperature sweep experiments were conducted with a frequency of 31.4 rad/sec using 0.5% strain for temperature ranging from −100° C. to −10° C., and 2% strain for the temperature ranging from −10° C. to 100° C. ΔG is the change in G' at 0.25% form G' at 14.75%. Payne effect (ΔG') data were obtained from the strain sweep experiment. A frequency of 3.14 rad/sec was used for strain sweep which is conducted at 50° C. with strain sweeping from 0.25% to 14.75%.

Various modifications and alterations that do not depart from the scope and spirit of this invention will become apparent to those skilled in the art. This invention is not to be duly limited to the illustrative embodiments set forth herein.

What is claimed is:

1. A tire component comprising:
a vulcanized residue of a functionalized polymer defined by the formula I

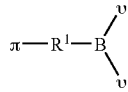

where π is a rubbery polymer chain, B is a boron atom, $R^1$ is a bond or a divalent organic group, and each υ is independently selected from alkoxy groups (—OR), where each R is independently selected from monovalent organic groups or two R groups form a divalent organic group, which forms a cyclic structure.

2. The tire component of claim 1, where the functionalized polymer is defined by the formula 1A

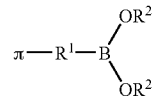

where π is a polymer chain, $R^1$ is a bond or a divalent organic group, B is a boron atom, O is an oxygen atom, and each $R^2$ is independently a monovalent organic group or two $R^2$ groups join to form a divalent organic group, which forms a cyclic structure.

3. The tire component of claim 1, where π is a rubbery polymer that has a glass transition temperature that is less than 0° C.

4. The tire component of claim 3, where π is a rubbery polymer selected from polybutadiene, polyisoprene, poly(styrene-co-butadiene), poly(styrene-co-butadiene-co-isoprene), poly(isoprene-co-styrene), and poly(butadiene-co-isoprene).

5. The tire component of claim 3, where the rubbery polymer has a number average molecular weight of from about 5 to 1,000 Kg/mol.

6. The tire component of claim 1, where the functionalized polymer is defined by the formula II

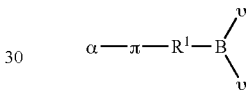

where α is a functionality or functional group that reacts or interacts with rubber or rubber fillers or otherwise has a desirable impact on filled rubber compositions or vulcanizates, π is a polymer chain, B is a boron atom, and υ is independently selected from alkoxy groups (—OR), where each R is independently selected from monovalent organic groups or two R groups form a divalent organic group, which forms a cyclic structure.

7. The tire component of claim 1, where the functionalized polymer is prepared by terminating a living polymer with an organoboron compound.

8. The tire component of claim 7, where the organoboron compound is defined by the formula III

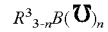

where each υ is independently selected from alkoxy groups (—OR), where each R is independently a monovalent organic group or two R groups form a divalent organic group, which forms a cyclic structure, each $R^3$ is independently a monoorganic group, a halide, or two $R^3$ groups form a divalent organic group, which forms a cyclic structure, and n is an integer from 1 to 3.

9. The tire component of claim 8, where the organoboron compound includes alkoxyboranes and mixes thereof.

10. The tire component of claim 9, where the organoboron compound is tri-n-butoxyborane.

11. The tire component of claim 9, where the organoboron compound is tri-t-butoxyborane.

12. The tire component of claim 9, where the organoboron compound is triphenoxyborane.

13. The tire component of claim 9, where the organoboron compound is trimethylboroxineborane.

14. The tire component of claim 7, where the tire component is a tire tread.

15. A tire component prepared by a process comprising: vulcanizing a rubber formulation comprising a vulcanizable rubber and a filler, where the vulcanizable rubber includes a functionalized polymer that is defined by the formula I

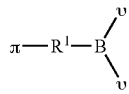

where π is a rubbery polymer chain, B is a boron atom, $R^1$ is a bond or a divalent organic group, and each υ is independently selected from alkoxy groups (—OR), where each R is independently selected from monovalent organic groups or two R groups form a divalent organic group, which forms a cyclic structure.

* * * * *

UNITED STATES PATENT AND TRADEMARK OFFICE
CERTIFICATE OF CORRECTION

| | | |
|---|---|---|
| PATENT NO. | : 7,598,322 B1 | Page 1 of 1 |
| APPLICATION NO. | : 11/189891 | |
| DATED | : October 6, 2009 | |
| INVENTOR(S) | : Rademacher et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Twenty-eighth Day of September, 2010

David J. Kappos
*Director of the United States Patent and Trademark Office*